United States Patent
Knott et al.

(10) Patent No.: US 8,802,744 B2
(45) Date of Patent: Aug. 12, 2014

(54) ALKYL CARBONATE ENDCAPPED POLYETHER SILOXANES AND PREPARATION THEREOF

(75) Inventors: Wilfried Knott, Essen (DE); Horst Dudzik, Essen (DE); Frauke Henning, Essen (DE); Frank Schubert, Neukirchen-Vluyn (DE); Michael Ferenz, Essen (DE); Roland Hubel, Essen (DE)

(73) Assignee: Evonik Degussa GmbH, Essen (DE)

( * ) Notice: Subject to any disclaimer, the term of this patent is extended or adjusted under 35 U.S.C. 154(b) by 95 days.

(21) Appl. No.: 13/566,630

(22) Filed: Aug. 3, 2012

(65) Prior Publication Data

US 2013/0035408 A1 Feb. 7, 2013

(30) Foreign Application Priority Data

Aug. 3, 2011 (DE) .......................... 10 2011 109 540

(51) Int. Cl.
*C07F 7/08* (2006.01)
*C08L 75/04* (2006.01)
*C09K 15/32* (2006.01)

(52) U.S. Cl.
USPC ........................... 521/112; 521/155; 556/437

(58) Field of Classification Search
None
See application file for complete search history.

(56) References Cited

U.S. PATENT DOCUMENTS

| | | | |
|---|---|---|---|
| 4,837,244 A | 6/1989 | Burkhart et al. | |
| 5,321,051 A | 6/1994 | Burkhart et al. | |
| 5,357,018 A | 10/1994 | Burkhart et al. | |
| 5,360,571 A * | 11/1994 | Kilgour et al. | 516/55 |
| 5,525,640 A | 6/1996 | Gerkin et al. | |
| 5,606,077 A * | 2/1997 | Lersch et al. | 549/214 |
| 6,858,663 B2 | 2/2005 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 7,425,283 B2 * | 9/2008 | Nakanishi et al. | 252/519.31 |
| 7,598,334 B2 | 10/2009 | Ferenz et al. | |
| 7,605,284 B2 | 10/2009 | Brueckner et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,635,581 B2 | 12/2009 | Ferenz et al. | |
| 7,645,848 B2 | 1/2010 | Knott et al. | |
| 7,722,995 B2 * | 5/2010 | Nakanishi et al. | 429/326 |
| 7,727,599 B2 | 6/2010 | Doehler et al. | |
| 7,754,778 B2 | 7/2010 | Knott et al. | |
| 7,776,989 B2 | 8/2010 | Ferenz et al. | |
| 7,825,205 B2 | 11/2010 | Knott et al. | |
| 7,825,206 B2 | 11/2010 | Neumann et al. | |
| 7,825,207 B2 | 11/2010 | Ferenz et al. | |
| 7,825,209 B2 | 11/2010 | Knott et al. | |
| 7,834,122 B2 | 11/2010 | Ferenz et al. | |
| 7,855,265 B2 | 12/2010 | Thum et al. | |
| 7,858,829 B2 | 12/2010 | Hubel et al. | |
| 7,893,128 B2 | 2/2011 | Busch et al. | |
| 7,964,694 B2 | 6/2011 | Ferenz et al. | |
| 8,030,366 B2 | 10/2011 | Ferenz et al. | |
| 8,324,325 B2 | 12/2012 | Knott et al. | |
| 2003/0212158 A1 | 11/2003 | Burkhart et al. | |
| 2007/0059539 A1 | 3/2007 | Doehler et al. | |
| 2007/0128143 A1 | 6/2007 | Gruning et al. | |
| 2007/0197678 A1 | 8/2007 | Cavaleiro et al. | |
| 2008/0125503 A1 | 5/2008 | Henning et al. | |
| 2008/0187702 A1 | 8/2008 | Ferenz et al. | |
| 2009/0088489 A1 | 4/2009 | Terheiden et al. | |
| 2009/0137751 A1 | 5/2009 | Knott et al. | |
| 2009/0137752 A1 | 5/2009 | Knott et al. | |
| 2010/0022435 A1 | 1/2010 | Henning et al. | |
| 2010/0029587 A1 | 2/2010 | Brueckner et al. | |
| 2010/0031852 A1 | 2/2010 | Herrwerth et al. | |
| 2010/0034765 A1 | 2/2010 | Herrwerth et al. | |
| 2010/0036011 A1 | 2/2010 | De Gans et al. | |
| 2010/0041910 A1 | 2/2010 | Schubert et al. | |
| 2010/0055760 A1 | 3/2010 | Thum et al. | |
| 2010/0056649 A1 | 3/2010 | Henning et al. | |
| 2010/0056818 A1 | 3/2010 | Ferenz et al. | |
| 2010/0071849 A1 | 3/2010 | Knott et al. | |
| 2010/0081763 A1 | 4/2010 | Meyer et al. | |
| 2010/0105843 A1 | 4/2010 | Knott et al. | |
| 2010/0113633 A1 | 5/2010 | Henning et al. | |
| 2010/0168367 A1 | 7/2010 | Schubert et al. | |
| 2010/0184913 A1 | 7/2010 | Ebbrecht et al. | |
| 2010/0210445 A1 | 8/2010 | Von Rymon Lipinski et al. | |
| 2010/0248325 A1 | 9/2010 | Eckstein et al. | |
| 2010/0249339 A1 | 9/2010 | Henning et al. | |
| 2010/0266518 A1 | 10/2010 | Springer et al. | |

(Continued)

FOREIGN PATENT DOCUMENTS

| | | |
|---|---|---|
| DE | 3724716 C1 | 6/1988 |
| DE | 102007057145 A1 | 6/2009 |

(Continued)

OTHER PUBLICATIONS

European Search Report dated Nov. 9, 2012 received in a corresponding foreign application.

*Primary Examiner* — Robert S Loewe

(74) *Attorney, Agent, or Firm* — Scully, Scott, Murphy & Presser, P.C.

(57) ABSTRACT

The present invention provides polysiloxane-polyether copolymers comprising at least one polyether moiety, characterized in that there is at least one polyether moiety capped with at least one —O—C(O)—O—R" unit where R" is identical or different alkyl moieties, a process for preparation thereof and use thereof, especially for polyurethane foam production.

16 Claims, No Drawings

(56) References Cited

U.S. PATENT DOCUMENTS

| | | |
|---|---|---|
| 2010/0266651 A1 | 10/2010 | Czech et al. |
| 2010/0286295 A1 | 11/2010 | Heisler et al. |
| 2010/0292357 A1 | 11/2010 | Knott et al. |
| 2010/0298455 A1 | 11/2010 | Henning et al. |
| 2011/0015290 A1 | 1/2011 | Schmitz et al. |
| 2011/0021693 A1 | 1/2011 | Henning et al. |
| 2011/0034576 A1 | 2/2011 | Henning et al. |
| 2011/0042004 A1 | 2/2011 | Schubert et al. |
| 2011/0046305 A1 | 2/2011 | Schubert et al. |
| 2011/0070175 A1 | 3/2011 | Herrwerth et al. |
| 2011/0091399 A1 | 4/2011 | Meyer et al. |
| 2011/0172373 A1 | 7/2011 | Knott et al. |
| 2011/0230619 A1 | 9/2011 | Kuppert et al. |
| 2011/0230633 A1 | 9/2011 | Ferenz et al. |
| 2011/0245412 A1 | 10/2011 | Schubert et al. |
| 2011/0251070 A1 | 10/2011 | Poffenberger et al. |
| 2011/0281973 A1 | 11/2011 | Schubert et al. |
| 2011/0301254 A1 | 12/2011 | Knott et al. |
| 2011/0306694 A1 | 12/2011 | Glos et al. |
| 2012/0010302 A1 | 1/2012 | Hartung et al. |
| 2012/0027704 A1 | 2/2012 | Henning et al. |
| 2012/0028022 A1 | 2/2012 | Brugger et al. |
| 2012/0029090 A1 | 2/2012 | Brugger et al. |
| 2012/0037036 A1 | 2/2012 | Veit et al. |
| 2012/0067520 A1 | 3/2012 | Schubert et al. |
| 2012/0068110 A1 | 3/2012 | Schubert et al. |
| 2012/0071564 A1 | 3/2012 | De Gans et al. |

FOREIGN PATENT DOCUMENTS

| | | |
|---|---|---|
| DE | 102009003274 A1 | 11/2010 |
| EP | 0 645 226 B1 | 3/1995 |
| EP | 0 798 327 A2 | 10/1997 |
| EP | 0 900 811 A1 | 3/1999 |
| EP | 1 520 870 B1 | 4/2005 |
| WO | WO 03/091320 A1 | 11/2003 |
| WO | WO 2006/002787 A1 | 1/2006 |

* cited by examiner

ALKYL CARBONATE ENDCAPPED POLYETHER SILOXANES AND PREPARATION THEREOF

FIELD OF THE INVENTION

The present invention provides polysiloxane-polyether copolymers comprising at least one polyether moiety, characterized in that there is at least one polyether moiety capped with at least one —O—C(O)—O—R" unit where R" is identical or different alkyl moieties, a process for preparation thereof and use thereof, especially for polyurethane foam production.

BACKGROUND OF THE INVENTION

Organomodified siloxanes, especially polyether siloxanes, are extensively used compounds in almost all sectors concerned with directed control of surface-active behavior. Substances of this type are used for example as surfactants, emulsifiers, dispersants, paint flow additives, lubricants, defoamers, as auxiliaries in enhanced oil recovery, as textile auxiliary for coating fibres, yarns or fabrics or as foam stabilizers in polyurethane foaming. The sheer variety of uses for this class of chemicals rests not least on the possibility of using a suitable combination of siloxane structures and polyethers as substituents to specifically obtain, alongside the hydrophilic/hydrophobic balance, other types of activity.

Polysiloxane-polyoxyalkylene copolymers, which contain modified units of polyoxyalkylene, are deserving of particular respect for use as an additive in the production of polyurethane foams. These foam stabilizers enable for example the formation of a uniform pore structure and stabilize the polymer matrix during foam production. The effectiveness of a polysiloxane-polyoxyalkylene copolymer in foam stabilization can only be predicted to a limited extent.

Polyether-polysiloxane copolymers are basically subdividable into two classes. Polyether-polysiloxane copolymers where the polyethers are linked to the polysiloxane chain via an SiOC bond are long known. Such copolymers are prepared by reacting hydroxyl-functional polyethers either with chlorosiloxanes in a substitution reaction or with alkoxysiloxanes in a transesterification reaction. This group of products is particularly notable for a wide processing latitude and a high activity, i.e., polyurethane foams of fine cell structure, the desired open/closed cell content and free of foam defects are obtained over a wide concentration range of the stabilizer. Polyurethane (PU) stabilizers of the SiOC product group are by virtue of these properties widely useable in a multiplicity of formulations. One disadvantage is the limited hydrolysis resistance of the SiOC bond, which limits the shelf life of the stabilizers and more particularly of their admixtures or formulations. A further disadvantage of SiOC stabilizers is their moderate solubility in polyol formulations, which can cause clouding or even signs of separation of the fully formulated polyol recipe. This issue presents particularly with rigid foam applications where preformulated mixtures containing polyols, catalysts, water/blowing agent, the foam stabilizer and optionally further additives, which are marketed as ready-to-use polyurethane foam systems, are frequently required to have solubility and separation resistance.

A desire to address the issue of poor stability in storage motivated the development of a second class of polyether-polysiloxane copolymers where the polyethers are attached to the polysiloxane by hydrolysis-stable SiC bonds. Preparation is by noble metal-catalyzed hydrosilylation of allyl polyethers with hydrogensiloxanes. PU stabilizers of the group of SiC products are notable for high solubility in polyol formulations as well as their good stability in storage. However, their use in hot-cure flexible foam applications does not enjoy the benefit of the broad processing latitude known from SiOC stabilizers, since the amount of stabilizer used has to be kept constant within a narrow range in order that consistently good foam properties may be obtained.

Platinum metal-catalyzed hydrosilylation is the currently practiced standard reaction for hydrolysis-stable organo-modification of hydrogen siloxanes. The industrial synthesis of polyether siloxanes linked Si—C largely rests on using the easily accessible allyl/vinyl polyethers.

The polyoxyalkylene block can be altered with regard to its composition of oxyalkylene units, especially oxyethylene, oxypropylene and oxybutylene. The term composition comprehends not only the relative number of oxyalkylene units represented therein, but also their distribution/arrangement in the polyether chains. Further characteristics are the molecular weight and the end group of the polyoxyalkylene block.

End groups customary in polyoxyalkylenes incorporated in commercial flexible polyurethane foam stabilizers are essentially the hydroxyl functionality, the methyl ether group, the butyl ether group or else the acetate function.

It has now been the case for some years that polyurethane foam systems are gaining ground which utilize high-pressure carbon dioxide as a blowing gas. This technology is described in EP-A-0 645 226 for example. The characteristic of this foaming technology is that the spontaneous frothing of the pressurized $CO_2$ as the PU reaction mixture is discharged places increased requirements on the cell formation characteristics of the components in the foam formulation. This is readily understood since conventional PU foaming is characterized by the slowly starting isocyanate-water reaction, which only produces slow $CO_2$ gas saturation of the liquid polymeric phase and subsequently a hesitant formation of gas bubbles.

Systems of this type are a technical challenge in that, despite the carbon dioxide turning into a gas within a fraction of a second, it is necessary to control the cell count and the cell size distribution as parameters of the later foam morphology and the foam properties resulting therefrom. Typical flaws due to inadequate process control are nonuniform, partly coarsened cells within the foam structure.

Ways to minimize these flaw scenarios reside, for example, in selecting suitable polyether-polysiloxane copolymers as foam stabilizers, as described in U.S. Pat. Nos. 5,357,018 or 5,321,051 for example, or in adding cyclic organic carbonates in polyurethane foam production especially in flexible polyurethane-polyether foam formulations, as taught in EP 0 900 811.

EP 0 798 327 describes a process for the preparation of polycarbonate copolyether diols in the form of a two-stage process. In a first step, a polyether glycol is reacted with bisdimethylcarbonate in the presence of a basic catalyst to form a polyether diol bisdimethylcarbonate which, in a subsequent second step, after distillative removal of the excess dimethyl carbonate and removal of the basic catalyst, is converted by acid-catalyzed transesterification into a polycarbonate-co-polyether diol. A disadvantages of such a preparation method resides in the working up of the intermediate step and the need to change the catalyst system.

U.S. Pat. No. 5,525,640 discloses silicone-based wetting agents and their use in polyurethane foam blown with inert gases. The core concept taught by this reference is that a polyurethane foam under inert gas pressure must ideally be stabilized using a comb-structured polyether siloxane where the ethylene oxide content of the polyether accounts for less than 37% of total alkylene oxide content. The teaching is supported by comparative foaming tests in mechanically wiped but also liquid $CO_2$ blown foam system on completely acetoxy- or methyl-capped comb-type polyether siloxanes. Alternative end groups disclosed for capping the polyoxyalkylene branches are —C(O)Z', —C(O)OZ" or —C(O)NHZ' where Z' comprises monofunctional alkyl or aryl groups of 1 to 8 carbon atoms. No particular importance is attributed to these end groups, as is also evident from the fact that acetate endcapping and methyl endcapping are preferred.

WO 03/091320 concerns silicone-based wetting agents particularly useful for rendering $CO_2$-blown polyurethane foam flame retardant when the cell structure is fine. The disclosure of U.S. Pat. No. 5,525,640 is taken up once more in again claiming comb-type polyether siloxanes where the ethylene oxide content of the polyether accounts for less than 37% of total alkylene oxide content and also, in addition to the specifically claimed endcappings with acetate and methyl groups also, in the polyoxyalkylene moiety, —C(O)Z', —CC(O)OZ' or —C(O)NHZ' where $Z^1$ comprises monofunctional alkyl or aryl groups of 1 to 8 carbon atoms.

Similarly, U.S. Patent Publication No. 2010/0286295, which concerns silicone-based wetting agents for use in polyurethane foams derived from vegetable oil polyetherols and which claims the special structural principle of alkyl-containing silicone polyethers, again describes the possibility of organocarbonate endcapping disclosed in WO 03/091320. Again, acetate or methyl endcapping is preferred.

Notwithstanding the progress made to date, available systems still lack any distinct improvement in the cell structure of polyurethanes in critical formulations or in foaming with liquid, pressurized gases.

SUMMARY OF THE INVENTION

One problem addressed by the present invention was therefore that of providing alternative foam stabilizers which preferably overcome one or more disadvantages of the prior art foam stabilizers and which preferably display good performance especially in the production of flexible polyurethane foam systems and/or in any foaming with liquid, pressurized gases.

It was found, then, that, surprisingly, this problem is solved by polysiloxane-polyoxyalkylene copolymers of formula (I), which have an organocarbonate function as capping.

The present invention accordingly provides polysiloxane-polyether copolymers comprising at least one polyether moiety, characterized in that there is at least one polyether moiety capped with at least one —O—C(O)—O—R" unit where R"=identical or different alkyl moieties.

The present invention likewise provides a process for preparing polysiloxane-polyether copolymers, characterized in that a polyorganosiloxane having at least one SiH or SiZ function, where Z=halogen, is reacted with at least one organic compound having at least one carbonate function and at least one further group capable of reacting with an SiH or SiZ function, and/or initially with an organic compound having an OH function and at least one group capable of reacting with an SiH or SiZ function and then with a dialkyl carbonate.

The present invention also provides for the use of polysiloxane-polyether copolymers according to the present invention or of polysiloxane-polyether copolymers prepared according to the present invention, as foam stabilizers in the production of polyurethane foams, in the production of polyurethane-based plastics, as surfactants for liquid $CO_2$ extraction, as surface-active substance for dry-cleaning or as emulsifier for cosmetic applications.

Using the polysiloxane-polyether copolymers according to the present invention as foam stabilizers has the advantage that the foaming composition has a distinctly higher $CO_2$ solubility. This enhanced $CO_2$ solubility shows itself in the production of flexible polyurethane foams in that polyether siloxanes according to the present invention, which are capped with organocarbonate functions, are distinguished from similarly structured polyether siloxane copolymers differing therefrom by methyl endcapping only, by a distinctly increased tendency for the foams to open and even collapse. The foaming results disclosed in the context of the inventive teaching claimed herein are impressive evidence of the controlling influence of the particular polyether endcap. The silicone polyether chosen in comparative example 1, i.e., an example which is not in accordance with the present invention, has hydroxyl end groups as well as methyl end groups in its polyoxyalkylene branches. The methyl endcap is represented at 75 eq %. On adding this flexible foam stabilizer to a flexible PU foam matrix at a use concentration of 0.5 part, settling is observed to be 1.3 cm. Inventive example 3 only needs a 46 eq % fraction of ethyl carbonate groups (based on total hydroxyl and ethyl carbonate groups being equal to 100 eq %) to produce a collapsed foam for an otherwise unchanged copolymeric structure.

In the case of the structurally analogous ethyl carbonate-endcapped polyether siloxane of inventive example 5, the 86.2 eq % degree of endcapping realized here leads at all use concentrations chosen (1.0 part, 0.6 part and 0.5 part) to a collapsed foam. This property, introduced by the partial incorporation of alkyl carbonate into the silicone-polyether structure, gives the PU foam producer the option to establish a system-adapted recipe interplay between foam stabilization and cell opening.

The tests show that carbonate-endcapped polysiloxane-polyethers need a lower degree of endcapping than, for example, methyl-endcapped polysiloxane-polyethers to achieve essentially the same performance as foam stabilizer.

In the synthesis of polyether siloxane-based flexible PU foam stabilizers, the inventive teaching additionally provides those skilled in the art with the option of rebalancing copolymers which tend to stabilize too much and therefore tend to close the PU foam too much (shrinkage tendency) via the specific, optionally subsequent incorporation of alkyl carbonate end groups.

When the alkyl carbonate-endcapped polyether siloxanes are used in admixture together with polyoxyalkylene alcohols (polyethers), a person skilled in the art will have no difficulty in experimentally determining the best concentration range for the components in order that a desired cell structure may be produced for a polyurethane foam. The result here is irrespective of whether the alkyl carbonate-endcapped polyether siloxanes are subsequently mixed with polyethers, or whether partly endcapped alkyl carbonate-endcapped polyether siloxanes are prepared using the process of the present invention by employing a previously determined excess of polyethers.

Therefore, the carbonate-endcapped polysiloxane-polyether copolymers of the present invention have the advantage that they need to be endcapped to a lesser degree, resulting in a saving of energy and raw materials.

Carbonate endcapping further has the advantage that the reagent used for endcapping (dimethyl carbonate) is less hazardous to man and material than the reagents used for methyl endcapping and acetyl endcapping, especially dimethyl sulphate or methyl chloride.

DETAILED DESCRIPTION OF THE INVENTION

The polysiloxane-polyether copolymers of the present invention, their preparation and also their use will now be described using examples without any intention to restrict the invention to these exemplary embodiments. Where ranges, general formulae or classes of compounds are indicated in what follows, they shall encompass not just the corresponding ranges or groups of compounds that are explicitly mentioned, but also sub-ranges and sub-groups of compounds which are obtainable by extraction of individual values (ranges) or compounds. Where documents are cited in the context of the present description, their content shall fully belong to the disclosure content of the present invention. Any percentages hereinbelow are, unless otherwise indicated, % by weight. In the case of compositions, the percentages are based on the overall composition, unless otherwise stated. Average values hereinbelow are number averages, unless otherwise stated. Measurements hereinbelow were determined at a pressure of 101 325 Pa and a temperature of 23° C., unless otherwise stated.

The polysiloxane-polyether copolymers of the present invention comprise at least one polyether moiety capped with at least one —O—C(O)—O—R'' unit where R'' is =identical or different alkyl moieties.

The polysiloxane-polyether copolymers of the present invention preferably satisfy formula (I):

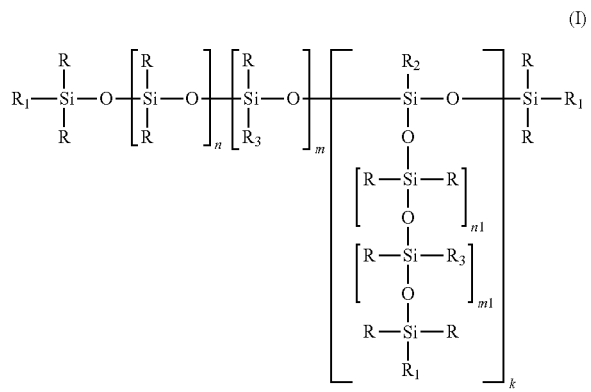

where
n and $n^1$ are each independently from 0 to 500, preferably from 10 to 200 and especially from 15 to 100 and $(n+n^1)$ is ≤500, preferably ≤200 and especially from >0 to ≤100, m and $m^1$ are each independently from 0 to 60, preferably from 0 to 30 and especially from 0.1 to 25 and $(m+m^1)$ is ≤60, preferably ≤30 and especially from >0 to ≤25, k=0 to 50, preferably from 0 to 10 and especially 0 or from 1 to 5,
R=alike or unalike moieties from the group of linear, cyclic or branched, aliphatic or aromatic, saturated or unsaturated hydrocarbon moieties having 1 up to 20 carbon atoms,

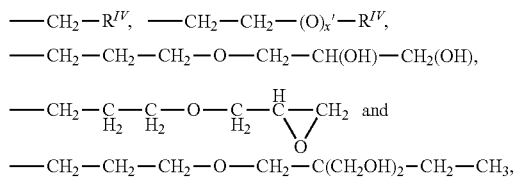

where
x' is equal to 0 or 1, and
$R^{IV}$ is an optionally substituted, optionally halogen-substituted hydrocarbon moiety having 1 to 50 carbon atoms, where R is preferably methyl and where more preferably all R moieties are methyl,
$R_1$ in each occurrence is independently R or $R_3$ or $R_7$,
$R_2$ in each occurrence is independently R or $R_3$ or $R_7$ or a heteroatom-substituted, functional, organic, saturated or unsaturated moiety, preferably selected from the group of alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl moieties and more preferably is methyl, chloropropyl, vinyl or methacryloyloxypropyl,
$R_3$ in each occurrence is the same or different and is a moiety of formula (Va) or (Vb)

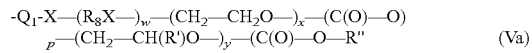

or

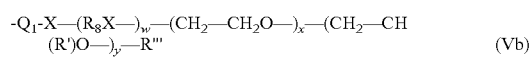

where
l=0 or 1,
X=in each occurrence independently $NR^Z$, O or S, preferably $NR^Z$ or O,
$R^Z$=the same or different in each occurrence, H or alkyl, preferably H,
Q=divalent hydrocarbon moiety of 2 to 6 carbon atoms, preferably
Q=—$CH_2$—$CH_2$—$CH_2$— or —$CH_2$—$CH_2$—
$R_8$, the same or different in each occurrence, is a branched or unbranched, cyclic, saturated, unsaturated hydrocarbon moiety having an at least 2 carbon atom chain between the heteroatoms X connected via the hydrocarbon moiety and preferably is a linear hydrocarbon moiety —$C_jH_{2j}$— where j≥2, preferably j=4 to 12 and more preferably j=6 to 10,
w=0 to 200, preferably 1 to 150 and more preferably from 3 to 20,
x=0 to 200, preferably 5 to 140 and more preferably from 10 to 100,
y=0 to 200, preferably 5 to 140 and more preferably from 10 to 100,
p=0 to 100, preferably 0 or 1 to 20, and more preferably from 0 or from 2 to 10, where the structural units bearing the indices w, x, y and p may form a blockwise arrangement or random distribution,
R'=identical or different, unsubstituted or optionally substituted, for example alkyl-, aryl- or haloalkyl- or haloaryl-substituted, alkyl or aryl groups having altogether 1 to 12 carbon atoms, preferably methyl or ethyl and more preferably methyl, and
R'', the same or different in each occurrence=an alkyl group, preferably of 1 to 30 carbon atoms, more preferably methyl or ethyl and even more preferably methyl,
R''', the same or different in each occurrence=hydrogen, an alkyl group of 1 to 30 carbon atoms, a —C(O)—R'' group where R'''=alkyl, a —$CH_2$—O—R' group, an alkylaryl group, for example benzyl, a —C(O)—O—R'''' group where R''''=alkyl or alkylaryl, a —C(O)—OR' group or a —C(O)NH—R' group, preferably alkyl, especially methyl, or acetyl,
$R_7$=crosslinker moiety which may be for example an organic moiety attached via hydrosilylation and/or dehydrogenative condensation and which may in turn be bonded to a polysiloxane moiety,
with the proviso that there is at least one $R_3$ of formula (Va).

Preferably, the polysiloxane-polyether copolymer of formula (I) according to the present invention contains no $R^7$ moiety.

In preferred polysiloxane-polyether copolymers of formula (I) according to the present invention, n and $n^1$ are each independently from 3 to 147 and $(n+n^1)$ is $\leq 150$, k is 0 or from 1 to 5, R=methyl, $R_1$=R or $R_3$, $R_2$=R or $R_3$ or chloropropyl, vinyl or methacryloyloxypropyl, and there is at least one $R_3$ which, the same or different in each occurrence, is -$Q_1$-X—$(R_8X—)_n$—$(CH_2—CH_2O—)_x$—$(CH_2—CH(R')O—)_y$—$(C(O)—O)_p$—R'' where l=0 or l=1 and Q=—$CH_2$—$CH_2$—$CH_2$—, $R_8$=a linear hydrocarbon moiety —$C_jH_{2j}$— where j=4 to 12, w=0 or from 1 to 100, x=0 or from 5 to 140, y=0 or from 5 to 140, with the proviso that the sum x+y is ≥5, p=from 1 to 10, R' the same of different in each occurrence=phenyl, methyl or ethyl, preferably methyl, and R'' is hydrogen, methyl, butyl or acetyl.

The polysiloxane-polyether copolymers of the present invention may exclusively have polyether moieties having at least one —O—C(O)—O—R'' unit as capping, especially those polyether moieties of formula (Va), or alternatively have not only polyether moieties having at least one —O—C(O)—O—R'' unit as capping, especially those polyether moieties of formula (Va), but also polyether moieties having no —O—C(O)—O—R' unit as capping, especially those of formula (Vb).

In one embodiment, it may be advantageous for the polysiloxane-polyether copolymers of the present invention to be mixtures which also include polysiloxane-polyether copolymers containing no polyether moieties having at least one —O—C(O)—O—R'' unit as capping.

Irrespective of whether the polysiloxane-polyether copolymers of the present invention form a mixture of polysiloxane-polyether copolymers of the present invention and polysiloxane-polyether copolymers not in accordance with the present invention, or there are only polysiloxane-polyether copolymers having polyether moieties with and without capping unit —O—C(O)—O—R'', it has proved to be advantageous for the molar fraction to be from 5 to 98 mol %, preferably from 20 to 75 mol % and more preferably from 35 to 60 mol %, for polyether moieties having a capping —O—C(O)—O—R'' unit, relative to the total number of polyether moieties present in each case in the polysiloxane-polyether copolymers.

In some embodiments of the present invention, it may be advantageous for the polysiloxane-polyether copolymers of the present invention to be in mixtures with one or more polyethers containing no silicon atoms. Preferred polyethers are especially those of the hereinbelow described formulae IIIa, IIIb, or IIIc.

When the polysiloxane-polyether copolymers of the present invention are in mixtures with one or more polyethers, the mass ratio of polysiloxane-polyether copolymers of formula (I) to silicon-free polyethers, especially those of formulae IIIa, IIIb and IIIc, is in the range from 60:40 to 90:10 and preferably in the range from 75:25 to 85:5.

The subject polysiloxane-polyether copolymers/mixtures containing the same are obtainable in various ways. Preferably, the subject polysiloxane-polyether copolymers/mixtures can be obtained or can be obtainable via the process of the present invention which will be described in greater detail herein below.

The process of the present invention for preparing polysiloxane-polyether copolymers comprises reacting a polyorganosiloxane having at least one SiH or SiZ function, where Z=halogen, with at least one organic compound having at least one carbonate function and at least one further group capable of reacting with an SiH or SiZ function, and/or initially with an organic compound having an OH function and at least one group capable of reacting with an SiH or SiZ function and then with a dialkyl carbonate.

Preferably, in the process of the present invention, compounds used as organic compounds having at least one or one further group capable of reacting with an SiH or SiZ function have an ethenyl or ethynyl end group as group capable of reacting with an SiH function.

The process of the present invention thus comprises the direct or indirect reaction of a polyorganosiloxane having an SiH or SiZ function, where Z=halogen atom, with at least one organic compound having a carbonate function.

In some embodiments of the present disclosure, it may be advantageous for the process of the present invention to be carried out such that, in the obtained polysiloxane-polyether copolymers or in the obtained mixtures of these polysiloxane-polyether copolymers with polysiloxane-polyether copolymers which are not in accordance with the present invention, preferably in the obtained polysiloxane-polyether copolymers, the molar fraction is from 5 to 98 mol %, preferably from 20 to 75 mol % and more preferably from 35 to 60 mol %, for polyether moieties having a capping —O—C(O)—O—R'' unit, relative to the total number of polyether moieties present in each case in the polysiloxane-polyether copolymers. This is achievable, depending on the process variant, via the ratio of carbonate-endcapped polyethers used which have a further group capable of reacting with an SiH or SiZ function, to non-endcapped polyethers used which have a further group capable of reacting with an SiH or SiZ function (variant A), or via the molar ratio used for OH groups of polyether moieties to organic carbonates (variant B).

Preferably, the polyorganosiloxane having at least one SiH or SiZ function that can be used in the present invention comprises polyorganosiloxanes having terminal and/or lateral SiH or SiZ functions, of formula (II),

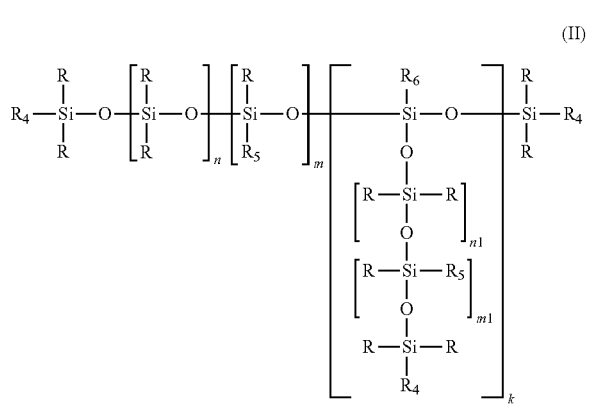

where n and $n^1$ are each independently from 0 to 500, preferably from 10 to 200 and especially from 15 to 100 and $(n+n^1)$ is ≤500, preferably ≤200 and especially from >0 to ≤100, m and $m^1$ are each independently from 0 to 60, preferably from 0 to 30 and especially from 0.1 to 25 and $(m+m^1)$ is ≤60, preferably ≤30 and especially from >0 to ≤25, k=0 to 50, preferably from 0 to 10 and especially 0 or from 1 to 5, R is as defined above, $R_4$ independently in each occurrence is hydrogen, Z or R, $R_5$ independently in each occurrence is hydrogen, Z or R,
$R_6$ independently in each occurrence is hydrogen, Z, R or a heteroatom-substituted, functional, organic, saturated or unsaturated moiety, preferably selected from the group of alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl moieties and more preferably is chloropropyl, vinyl or methacryloyloxypropyl,
with the proviso that at least one of $R_4$, $R_5$ and $R_6$ is hydrogen or Z.

Preferably, the polyorganosiloxane having at least one SiH function or SiZ function that can be used in the present invention comprises polyorganosiloxanes having terminal and/or lateral SiH or SiZ functions, of formula (II), wherein n and $n^1$ are each independently from 15 to 100 and $(n+n^1)$ is ≤100, k is 0 or from 1 to 5, R=methyl, and $R_6$=R or chloropropyl, vinyl or methacryloyloxypropyl.

Variant A)

When the process of the present invention for preparing polysiloxane-polyether copolymers is carried out by reacting a polyorganosiloxane having at least one SiH or SiZ function, where Z=halogen atom, with at least one organic compound having at least one carbonate function and at least one further group capable of reacting with an SiH or SiZ function, organic compounds having at least one carbonate function and at least one further group capable of reacting with an SiH or SiZ function comprise polyethers of formula (IIIa),

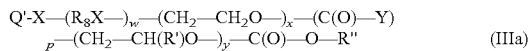
$$Q'-X-(R_8X-)_w-(CH_2-CH_2O-)_x-(C(O)-Y)_p-(CH_2-CH(R')O-)_y-C(O)-O-R'' \quad \text{(IIIa)}$$

where Q'=H or $CH_2=CH-(CH_2)_q-$ or $CH\equiv C-(CH_2)_q-$ and q=0 or 1, preferably 1, p=1 to 100, preferably 1 to 10, Y=in each occurrence independently $NR^z$, O, S, preferably $NR^z$ or O, most preferably O, and $R^z$=the same or different in each occurrence, H or alkyl, preferably H,
R", w, x, y, $R_8$ and R' are each as defined above.

These polyethers are obtainable, for example, by reacting unsaturated polyoxyalkylene compounds having primary or secondary OH functions, specifically allyl polyetherols, with an organocarbonate, preferably a dialkyl carbonate, e.g., dimethyl carbonate or diethyl carbonate, preferably diethyl carbonate, in the presence of a suitable basic catalyst, preferably at temperatures above room temperature. The in-principle process for preparing aliphatic oligocarbonate polyols having secondary OH groups is described for example in WO 2006/002787, expressly incorporated herein by reference. Useful basic catalysts include the carbonates of alkali or alkaline earth metals, especially potassium carbonate or sodium carbonate, but also tetraalkylammonium hydroxides for example. An alcohol is released to form alkyl carbonate-endcapped unsaturated polyoxyalkylene compounds, preferably those of formula (IIIa). The temperature at which the reaction is carried out is preferably in the range from 50 to 250° C. and more preferably in the range from 100 to 200° C.

Suitable polyethers having an OH group and a vinyl or ethynyl end group are more particularly also obtainable by the literature method of alkaline alkoxylation of a vinyl-containing alcohol, especially allyl alcohol, or by using DMC catalysts as described in the prior art, for example in DE 10 2007 057145 A1.

The polyether used of formula (IIIa) is preferably a polyether of formula (IIIa) wherein Q'=$CH_2$=$CH$—$CH_2$—, and X and Y are each O, $R_8$=a linear hydrocarbon moiety —$C_jH_{2j}$— where j=4 to 12, w=0 or from 1 to 100, preferably 0, x=0 or from 5 to 140, and preferably from 5 to 40, y=0 or from 5 to 140, with the proviso that the sum x+y is ≥5, p=1 to 10, R'=methyl or ethyl, preferably methyl, and R" is methyl or butyl, or wherein Q'=H, X and Y are each O, $R_8$=a linear hydrocarbon moiety —$C_jH_{2j}$— where j=4 to 12, w=0 or from 1 to 100, preferably 0, x=0 or from 5 to 140, and preferably from 5 to 40, y=0 or from 5 to 140, with the proviso that the sum x+y is ≥5, p=1 to 10, R'=methyl or ethyl, preferably methyl and R" is hydrogen or methyl or butyl.

After an optional removal of alcohol and/or of alkaline catalyst, these organic compounds, which have at least one carbonate function and at least one further group capable of reacting with an SiH or SiZ function, can be reacted with a polyorganosiloxane having at least one SiH or SiZ function, where Z=halogen atom. The reaction preferably takes the form of a hydrosilylation and more preferably of a noble metal-, especially platinum-catalyzed reaction. Preferred catalysts, such as the WK catalyst, are described in EP 1 520 870 for example.

To obtain polysiloxane-polyether copolymers of the present invention which have not only organocarbonate-endcapped polyether moieties but also polyether moieties with no organocarbonate endcapping, mixtures of polyethers of formula (IIIa) can also be used in combination with those of formulae (IIIb) and/or (IIIc). In such a case, the polysiloxanes used have to have two or more SiH and/or SiZ functions. When such mixtures of polyethers are used, these mixtures preferably contain sufficient polyethers of formula (IIIa) for the molar ratio of polyethers of formula (IIIa) to polyorganosiloxane having at least one SiH or SiZ function, where Z=halogen atom, to be 1:1 and more preferably >1:1.

The mixing ratio of polyethers is preferably chosen such that the proportion of polyethers having a capping unit —O—C(O)—O—R", relative to the total number of polyethers used, is from 5 to 98 mol %, more preferably from 20 to 75 mol % and even more preferably from 35 to 60 mol %.

Variant B)

When the process of the present invention is carried out by reacting an organic compound having an OH function and at least one group capable of reacting with an SiH or SiZ function and subsequently reacting the OH function, at least partly, with an organocarbonate, especially a dialkyl carbonate, the organic compound used is preferably a compound of formula (IIIc)

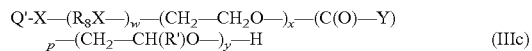
$$Q'-X-(R_8X-)_w-(CH_2-CH_2O-)_x-(C(O)-Y)_p-(CH_2-CH(R')O-)_y-H \quad \text{(IIIc)}$$

where Q', p, Y, X, w, x, y, $R_8$ and R' are each as defined above.

Preferably, the organic compounds used in the process of the present invention as having an OH function and at least one further group capable of reacting with an SiH or SiZ function comprise polyethers of formula (IIIb),

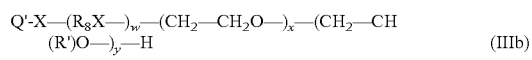
$$Q'-X-(R_8X-)_w-(CH_2-CH_2O-)_x-(CH_2-CH(R')O-)_y-H \quad \text{(IIIb)}$$

where Q'=H or $CH_2$=CH—$(CH_2)_q$— or CH≡C—$(CH_2)_q$— and q=0 or 1, preferably 1, and X, w, x, y, $R_8$ and R' are each as defined in preceding claims.

The reaction can be carried out according to a prior art process as hydrosilylation for example. The reaction preferably takes the form of a hydrosilylation, more preferably of a noble metal—especially platinum-catalyzed reaction. Preferred catalysts, such as the WK catalyst for example, are described in EP 1 520 870 for example.

The polyether-polysiloxane thus obtained, which has polyether moieties with free OH groups, is subsequently reacted with organic carbonates, preferably the abovementioned dialkyl carbonates, more preferably in an alkali-catalyzed reaction. This reaction can in turn be carried out using the abovementioned catalysts and also the abovementioned reaction conditions. The possibility of adopting this process variant of the present invention is particularly surprising to a person skilled in the art, since alkaline catalysts would be expected to cause the siloxane structures to rearrange, which would lead to an efflux of siloxane cycles for example in certain circumstances. The polysiloxanes do not even equilibrate when tetraalkylammonium hydroxide is used as alkaline catalyst.

In one preferred variant of the process according to variant b) of the present invention, the amount of organic carbonates used is chosen such that there is a molar excess of OH groups relative to the carbonates. The excess of OH groups is preferably in the range from 10 mol % to 60 mol %, based on the carbonates. A partly endcapped polysiloxane polyether is obtainable in this way. The ratio of organic carbonate used to OH groups is preferably chosen such that the proportion of polyether moieties having a capping unit —O—C(O)—O—R" is from 5 to 98 mol %, preferably from 20 to 75 mol % and more preferably from 35 to 60 mol %, relative to the total number of polyether moieties present.

The organic compounds used in the process of the present invention as having an OH function and at least one further group capable of reacting with an SiH or SiZ function preferably comprise polyethers of formula (IIIb),

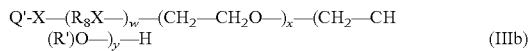

(IIIb)

where Q'=H or $CH_2$=CH—$(CH_2)_q$— or CH≡C—$(CH_2)_q$— and q=0 or 1, preferably 1, and X, w, x, y, $R_8$ and R' are each as defined in preceding claims.

Suitable polyethers having no carbonate group and a vinyl or ethynyl end group are more particularly also obtainable by the literature method of alkaline alkoxylation of a vinyl-containing alcohol, especially allyl alcohol, or by using DMC catalysts as described in the prior art, for example in DE 10 2007 057145 A1.

The polysiloxane-polyether copolymers of the present invention or the polysiloxane-polyether copolymers obtained according to the present invention can be used for example as foam stabilizers in the production of polyurethane foams, in the production of polyurethane-based plastics, as surfactants for liquid $CO_2$ extraction, as surface-active substance for dry-cleaning or as emulsifier for cosmetic applications.

When the polysiloxane-polyether copolymers of the present invention are used more particularly as a foam stabilizer in polyurethane foam production, the polyurethane foams can be produced using any known processes and formulations. In principle, polyurethane foam production is preferably as described for example in DE 3724716 and DE 102009003274 and also the references cited therein.

When the polysiloxane-polyether copolymers of the present invention are used in the production of polyurethane foams, $CO_2$ is preferably used as a blowing agent.

Polyurethane foams are preferably produced using polyether carbonate polyols as polyol components.

The polyurethane foam of the present invention contains at least one polysiloxane-polyether copolymer which is in accordance with the present invention or is obtained in accordance with the present invention. The mass proportion of the final polyurethane foam that is attributable to compounds of formula (I) is preferably in the range from 0.01% to 10% by weight and more preferably in the range from 0.1% to 3% by weight. The polyurethane foam of the present invention may be, for example, a rigid polyurethane foam, a flexible polyurethane foam, a viscoelastic foam, an HR foam, a semirigid polyurethane foam, a thermoformable polyurethane foam or an integral foam. The term polyurethane here is to be understood as generic for a polymer prepared from di- or polyisocyanates and polyols or other isocyanate-reactive species, such as amines for example, in that the urethane bond need not be the exclusive or predominant type of bond. Polyisocyanurates and polyureas are expressly co-encompassed.

The polyurethane foams can be used for example as refrigerator insulation, insulation panel, sandwich element, tube insulation, spray foam, 1- & 1.5-component can foam, wood imitation, modelling foam, packaging foam, mattress, furniture cushioning, automotive seat cushioning, headrest, dashboard, automotive interior, automotive roof liner, sound absorption material, steering wheel, shoe sole, carpet backing foam, filter foam, sealing foam and adhesive or for producing corresponding products.

The subject matter of the present invention is herein below more particularly elucidated using examples without any intention to restrict the subject matter of the invention to these exemplary embodiments.

EXAMPLES

Example 1

Not According to the Invention

In a 500-ml 4-neck round-bottomed flask equipped with KPG stirrer, thermometer, gas inlet tube and reflux condenser, a mixture of
82.1 g of a polyether having the average formula
$CH_2$=CH—$CH_2$O—$(C_2H_4O)_4(C_3H_6O)_{20}$—$CH_3$ with
15.8 g of a polyether having the average formula
$CH_2$=CH—$CH_2$O—$(C_2H_4O)_{13}(C_3H_6O)_{13}$—$CH_3$ and
39.9 g of a polyether having the average formula
$CH_2$=CH—$CH_2$O—$(C_2H_4O)_{36}(C_3H_6O)_{37}$—$CH_3$ and also
119.3 g of a polyether having the average formula
$CH_2$=CH—$CH_2$O—$(C_2H_4O)_{36}(C_3H_6O)_{37}$—H
and 60 g of a poly(methylhydrogen)polydimethylsiloxane copolymer having an average molecular weight of 5000 g/mol and an SiH content of 1.30 mmol/g under vigorous agitation and inert gas blanketing was heated to 70° C. and then admixed with 5 ppm of Pt (based on the total batch) in the form of the so-called WK catalyst described in EP 1 520 870. The sodium butoxide-induced decomposition of a reaction mixture aliquot drawn after 2 hours and weighed into a gas decomposition apparatus did not display any hydrogen release whatsoever and thus evidenced complete SiH conversion. The reaction batch was cooled down to room temperature and an almost colorless polyether siloxane was isolated. The polysiloxane-polyether copolymer obtained had a degree of methyl endcapping equal to 75 mol %.

Example 2

Not According to the Invention

In a 500-ml 4-neck round-bottomed flask equipped with KPG stirrer, thermometer, gas inlet tube and reflux condenser, a mixture of
85.7 g of a polyether having the average formula
$CH_2$=CH—$CH_2$O—$(C_2H_4O)_4(C_3H_6O)_{20}$—H with
15.4 g of a polyether having the average formula
$CH_2$=CH—$CH_2$O—$(C_2H_4O)_{13}(C_3H_6O)_{13}$—H and
164.5 g of a polyether having the average formula
$CH_2$=CH—$CH_2$O—$(C_2H_4O)_{36}(C_3H_6O)_{37}$—H
and 60 g of a poly(methylhydrogen)polydimethylsiloxane copolymer having an average molecular weight of 5078 g/mol and an SiH content of 1.28 mmol/g under vigorous agitation and inert gas blanketing was heated to 70° C. and then admixed with 5 ppm of Pt (based on the total batch) in the form of the so-called WK catalyst described in EP 1 520 870. The sodium butoxide-induced decomposition of a reaction mixture aliquot drawn after 2 hours and weighed into a gas decomposition apparatus did not display any hydrogen release whatsoever and thus evidenced complete SiH conversion. The reaction batch was cooled down to room temperature and an almost colorless, clear polyether siloxane terminated with secondary OH groups (OH number: 18 mg of KOH/g of substance) was isolated.

Example 3

According to the Invention

Ethyl Carbonate Endcapping of Polyether Siloxane Obtained in Example 2

200 g of the hydroxyl-functional polyether siloxane obtained in Example 2 were together admixed with 30 g (0.254 mol) of diethyl carbonate and 4.6 g of potassium carbonate (2 mass percent based on total batch) and the reaction mixture was heated in a rotary evaporator at 140° C. for 3 hours. Volatiles were distillatively removed by applying an auxiliary vacuum (about 1 mbar oil pump vacuum). Following removal of solids by filtration in a pressure filter press through a Seitz K 300 filter disc, a clear, slightly yellowish liquid product was isolated with an OH number of 9.7 mg of KOH/g of substance. This OH number corresponded to a degree of ethyl carbonate endcapping (based on all OH groups) of 46 mol %.

Example 4

Not According to the Invention

In a 500-ml 4-neck round-bottomed flask equipped with KPG stirrer, thermometer, gas inlet tube and reflux condenser, a mixture of 103.3 g of a polyether having the average formula
$CH_2=CH-CH_2O-(C_2H_4O)_4(C_3H_6O)_{20}-(C_2H_4O)_5-H$
with 17.9 g of a polyether having the average formula
$CH_2=CH-CH_2O-(C_2H_4O)_{13}(C_3H_6O)_{13}-(C_2H_4O)_5-H$
and 173.7 g of a polyether having the average formula
$CH_2=CH-CH_2O-(C_2H_4O)_{36}(C_3H_6O)_{37}-(C_2H_4O)_5-H$
and 60 g of a poly(methylhydrogen)polydimethylsiloxane copolymer having an average molecular weight of 5078 g/mol and an SiH content of 1.28 mmol/g under vigorous agitation and inert gas blanketing was heated to 70° C. and then admixed with 5 ppm of Pt (based on the total batch) in the form of the so-called WK catalyst described in EP 1 520 870. The sodium butoxide-induced decomposition of a reaction mixture aliquot drawn after 2 hours and weighed into a gas decomposition apparatus did not display any hydrogen release whatsoever and thus evidenced complete SiH conversion. The reaction batch was cooled down to room temperature and an almost colorless, clear polyether siloxane terminated with primary OH groups (OH number: 21.7 mg of KOH/g of substance) was isolated.

Example 5

According to the Invention

Ethyl Carbonate Endcapping of Polyether Siloxane Obtained in Example 4

150 g of the hydroxyl-functional polyether siloxane obtained in Example 4 were together admixed with 27.4 g (0.232 mol) of diethyl carbonate and 3.5 g of potassium carbonate (2 mass percent based on total batch) and the reaction mixture was heated in a rotary evaporator at 140° C. for 3 hours. Volatiles were distillatively removed by applying an auxiliary vacuum (about 1 mbar oil pump vacuum). Following removal of solids by filtration in a pressure filter press through a Seitz K 300 filter disc, a clear, slightly yellowish product was isolated with an OH number of 3.0 mg of KOH/g of substance. This OH number corresponded to a degree of ethyl carbonate endcapping (based on all OH groups) of 86.2 mol %.

Example 6

Not According to the Invention

In a 1000-ml 4-neck round-bottomed flask equipped with KPG stirrer, thermometer, gas inlet tube and reflux condenser, a mixture of 350.6 g of a polyether having the average formula $CH_2=CH-CH_2O-(C_2H_4O)_8-H$ and 500 g of a poly(methylhydrogen)polydimethylsiloxane copolymer having an average molecular weight of 5114 g/mol and an SiH content of 1.27 mmol/g under vigorous agitation and inert gas blanketing was heated to 50° C. and then admixed with 5 ppm of Pt (based on the total batch) in the form of the so-called WK catalyst described in EP 1 520 870. The ensuing, vigorously exothermic reaction was moderated by using a water bath. After 2 hours, an aliquot sample was taken, weighed into a gas decomposition apparatus and admixed therein with sodium butoxide solution, so that the hydrogen released in the process of decomposition may give a direct clue to the SiH conversion achieved. In the example under consideration, conversion was quantitative, i.e., no hydrogen evolution whatsoever was observed. The reaction batch was cooled down to room temperature and an almost colorless, clear polyether siloxane terminated with primary OH groups (OH number: 59 mg of KOH/g of substance) was isolated.

Example 7

According to the Invention

Ethyl Carbonate Endcapping of Polyether Siloxane Obtained in Example 6

178.7 g of the hydroxyl-functional polyether siloxane obtained in Example 6 were together admixed with 85.2 g (0.72 mol) of diethyl carbonate and 5.3 g of potassium carbonate (2 mass percent based on total batch) and the reaction mixture was heated in a 1-1 round-bottomed flask connected to a rotary evaporator at 140° C. for 3 hours. Volatiles were distillatively removed by applying an auxiliary vacuum (about 1 mbar oil pump vacuum). Following cooling and removal of solids by filtration in a pressure filter press through a Seitz K 300 filter disc, a clear, slightly yellowish product was isolated with an OH number of 4 mg of KOH/g of substance. This OH number corresponded to a degree of ethyl carbonate endcapping (based on all OH groups) of 93 mol %.

Example 8

According to the Invention

Ethyl Carbonate Endcapping of Polyether Terminated with Primary OH Groups 155.2 g (0.388 mol) of a polyether having the average formula $CH_2=CH-CH_2O-(C_2H_4O)_8-H$ were admixed with 179.23 g (1.52 mol) of diethyl carbonate and 6.7 g of potassium carbonate (2 mass percent based on the reaction batch) and the reaction mixture was heated at 140° C. in a 1-1 round-bottomed flask connected to a rotary evaporator for 3 hours. Volatiles were then distillatively removed by applying an auxiliary vacuum (about 1 mbar oil pump vacuum). After cooling and removal of solids by filtration, a slightly yellowish, clear ethyl carbonate-terminated allyl polyether having an OH number of 4 mg of KOH/g of substance was isolated. Given an initial OH number of 144 mg of KOH/g of polyether, the degree of (ethyl carbonate) endcapping achieved was 97.2 mol %.

Example 9

According to the Invention

Preparation of Ethyl Carbonate-Terminated Silicone-Polyether Copolymer Via Hydrosilylation In a 250-ml 4-neck round-bottomed flask equipped with KPG stirrer, thermometer, gas inlet tube and reflux condenser, 66.5 g of the polyether obtained in Example 8 and 80 g of a poly(methylhydrogen)polydimethylsiloxane copolymer having an average molecular weight of 5078 g/mol and an SiH content of 1.28 mmol/g under vigorous agitation and inert gas blanketing were heated to 50° C. and then admixed with 5 ppm of Pt (based on the total batch) in the form of the so-called WK catalyst described in EP 1 520 870. The ensuing exotherm of the SiC linking reaction heated the reaction batch to above 90° C. After 2 hours, an aliquot sample was taken, weighed into a gas decomposition apparatus and admixed therein with sodium butoxide solution, so that the hydrogen released in the process of decomposition may give a direct clue to the SiH conversion achieved. In the example under consideration, conversion was quantitative, i.e., no hydrogen evolution whatsoever was observed. The reaction batch was cooled to room temperature and a clear, slightly yellowish polyether siloxane terminated with ethyl carbonate groups was isolated.

Example 10

According to the Invention

Ethyl Carbonate Endcapping of Polyether Terminated with Primary OH Groups 200 g (0.144 mol) of a polyether having the average formula $CH_2=CH-CH_2O-(C_2H_4O)_4(C_3H_6O)_{20}-(C_2H_4O)_5-H$ were admixed with 68.2 g (0.577 mol) of diethyl carbonate and 5.4 g of potassium carbonate (2 mass percent based on the reaction batch) and the reaction mixture was heated at 140° C. in a 500-ml round-bottomed flask connected to a rotary evaporator for 3 hours. Volatiles were then distillatively removed by applying an auxiliary vacuum (about 1 mbar oil pump vacuum). After cooling and removal of solids by filtration, a slightly yellowish, clear ethyl carbonate-terminated allyl polyether having an OH number of 2 mg of KOH/g of substance was isolated. Given an initial OH number of 40.5 mg of KOH/g of polyether, the degree of (ethyl carbonate) endcapping achieved was 95.0 mol %.

Example 11

According to the Invention

Preparation of Ethyl Carbonate-Terminated Silicone-Polyether Copolymer Via Hydrosilylation In a 250-ml 4-neck round-bottomed flask equipped with KPG stirrer, thermometer, gas inlet tube and reflux condenser, a mixture of
109.1 g of the polyether obtained in Example 10 and
15.6 g of a polyether having the average formula $CH_2=CH-CH_2O-(C_2H_4O)_{13}(C_3H_6O)_{13}-H$ and
167.0 g of a polyether having the average formula $CH_2=CH-CH_2O-(C_2H_4O)_{36}(C_3H_6O)_{37}-H$
and 60 g of a poly(methylhydrogen)polydimethylsiloxane copolymer having an average molecular weight of 5000 g/mol and an SiH content of 1.30 mmol/g under vigorous agitation and inert gas blanketing were heated to 50° C. and then admixed with 5 ppm of Pt (based on the total batch) in the form of the so-called WK catalyst described in EP 1 520 870. The ensuing exotherm of the SiC linking reaction heated the reaction batch to above 90° C. After 2 hours, an aliquot sample was taken, weighed into a gas decomposition apparatus and admixed therein with sodium butoxide solution, so that the hydrogen released in the process of decomposition may give a direct clue to the SiH conversion achieved. In the example under consideration, conversion was quantitative, i.e., no hydrogen evolution whatsoever was observed. The reaction batch was cooled to room temperature and a clear, slightly yellowish polyether siloxane partially terminated with ethyl carbonate groups was isolated.

Performance Testing:

The synthesized foam stabilizers were performance tested using a foam recipe in the following way:

In each case, 300 parts of a commercially available polyether (Polyol Desmophen Arcot 1107, from Bayer) for producing flexible polyurethane foams, which has three hydroxyl groups in the average molecule and a molecular weight of 3500, were mixed with 15 parts of water, 15 parts of a customary physical blowing agent, the appropriate amount of the in-test foam stabilizer, 0.33 part of diethylenetriamine and 0.69 part of tin octoate under efficient agitation. Following addition of 189 parts of tolylene diisocyanate (isomers 2,4 and 2,6 mixed in a ratio of 4:1), the mixture was stirred with a Glatt stirrer at 2500 rpm for 7 seconds and poured into a box open at the top (length=27 cm, width=27 cm, height=25 cm). The foamed material was a fine-cell foam which was characterized by the following parameters:
1 settling of foam at end of rise
2 number of cells per centimeter of foam, determined microscopically Table 1 below gives an overview of the synthesis parameters and foaming results of the stabilizers obtained according to the two inventive examples and also according to the non-inventive, comparative example 1, and compares the measurements for 3 different concentrations (1.0 part/0.6 part/0.5 part):

TABLE 1

Results of performance testing

| Stabilizer as per | Use concentration | Settling [cm] | Cells per centimeter | Endcapping [mol %] (type of endcap) |
|---|---|---|---|---|
| Example 1 | 1.0 part | n.d. | n.d. | 75% |
|  | 0.6 part | 0.8 | 12-13 | (methyl) |
|  | 0.5 part | 1.3 | n.d. |  |
| Example 3 | 1.0 part | 1.4 | n.d. | 46% |
|  | 0.6 part | 3.5 | 11 | (ethyl carbonate) |
|  | 0.5 part | collapse | n.d. |  |
| Example 5 | 1.0 part | collapse | n.d. | 86% |
|  | 0.6 part | collapse | n.d. | (ethyl carbonate) |
|  | 0.5 part | collapse | n.d. |  |
| Example 11 | 1.0 part | n.d. | n.d. | 55% |
|  | 0.6 part | 1.0 | 14 | (ethyl carbonate) |
|  | 0.5 part | 1.5 | n.d. |  | n.d.: not determined

Inventive example 3 demonstrates the production of such a system partially carbonate-endcapped at secondary polyether alcohol groups, and also the effect of this novel, surface-active copolymer on a conventional flexible PU foam matrix. At a low concentration of 0.5 part based on the foaming matrix, the cell-opening effect is already so considerable that foam collapse was observed. It was only at higher use concentrations of 0.6 and 1 part based on the foaming matrix that foam stabilization was ensured coupled with still significant settling.

This observed cell-opening tendency to the point of defoaming was all the more apparent when the polyether siloxane had primary OH functions attached to a comparable base structure and became esterified with organocarbonate groups in the course of the teaching according to the invention (inventive example 5). Carbonate endcapping of 86% was obtained. Throughout the entire concentration range considered, of 0.5, 0.6 (and 1 part) of the foam stabilizer thus prepared, based on the flexible foam matrix to be foamed, collapse was observed.

Carbonate group endcapping at 55 mol % in inventive example 11 gives, at a low use concentration of 0.6 part, a cell fineness which even exceeds that offered at identical use concentration by a 75% methyl-endcapped polyether siloxane system of comparable structural base (14 cells/cm versus 12-13 cells/cm). These observations show that the structural feature of organocarbonate endcapping on the polyether moieties of polyether siloxanes was very useful as system behavior control element in flexible polyurethane foam systems specifically.

The present alkyl carbonate-endcapped polysiloxane polyethers/mixtures thereof, which optionally also include at least one polyether, are therefore very useful for stabilizing polyurethane foams and controlling cell structure. It is incumbent upon the person skilled in the art to determine the concentration ranges via simple preliminary tests according to application and cell structure to be obtained.

While the present invention has been particularly shown and described with reference to the preferred embodiments, it will be readily appreciated by those of ordinary skill in the art that various changes and modifications may be made without departing from the spirit and scope of the invention. It is intended that the present invention be understood to cover the disclosed embodiments, those alternatives which have been discussed and all equivalents thereto.

What is claimed is:

1. A polysiloxane-polyether copolymer comprising at least one polyether moiety capped with at least one —O—C(O)—O—R" unit where R"=identical or different alkyl moieties, wherein said polysiloxane-polyether copolymer containing said at least one polyether moiety capped with said at least one —O—C(O)—O—R" unit has a molar fraction of from 5 to 98 mol % for polyether moieties having a capping —O—C(O)—O—R" unit, relative to the total number of polyether moieties present.

2. The polysiloxane-polyether copolymer according to claim 1, wherein the polysiloxane-polyether copolymer is of formula (I):

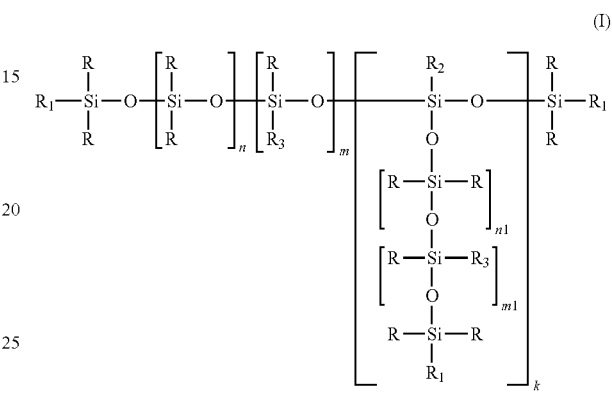

(I)

where n and $n^1$ are each independently from 0 to 500, $(n+n^1)$ is $\leq 500$, m and $m^1$ are each independently from 0 to 60, $(m+m^1)$ is $\leq 60$, k=0 to 50, R=identical or different moieties comprising linear, cyclic or branched, aliphatic or aromatic, saturated or unsaturated hydrocarbon moieties having 1 up to 20 carbon atoms,

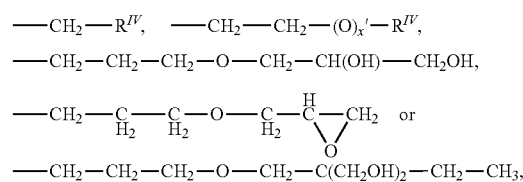

where x' is equal to 0 or 1, and $R^{IV}$ is an optionally substituted, optionally halogen-substituted hydrocarbon moiety having 1 to 50 carbon atoms, $R_1$ in each occurrence is independently R or $R_3$ or $R_7$, $R_2$ in each occurrence is independently R or $R_3$ or $R_7$ or a heteroatom-substituted, functional, organic, saturated or unsaturated moiety, $R_3$ in each occurrence is the same or different and is a moiety of formula (Va) or (Vb)

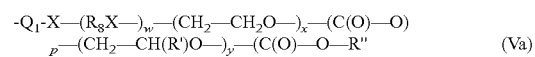

or

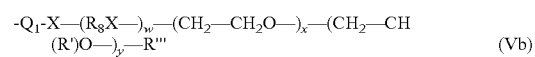

where l=0 or 1,

X=in each occurrence independently $NR^Z$, O or S, $R^Z$=the same or different in each occurrence, H or alkyl,
Q=divalent hydrocarbon moiety of 2 to 6 carbon atoms,
$R_8$, the same or different in each occurrence, is a branched or unbranched, cyclic, saturated, unsaturated hydrocarbon moiety having an at least 2 carbon atom chain between the heteroatoms X connected via the hydrocarbon moiety,
w=0 to 200,
x=0 to 200,
y=0 to 200,
p=0 to 100,
where the structural units bearing the indices w, x, y and p may form a blockwise arrangement or random distribution,
R'=identical or different, unsubstituted or optionally substituted alkyl or aryl groups having altogether 1 to 12 carbon atoms, and
R", the same or different in each occurrence=an alkyl group, R''' is the same or different in each occurrence and is hydrogen, an alkyl group of 1 to 30 carbon atoms, a —C(O)—R''' group where R'''=alkyl, a —CH$_2$—O—R' group, an alkylaryl group, a —C(O)—O—R''' group where R'''=alkyl or alkylaryl, a —C(O)—OR' group or a —C(O)NH—R' group, $R_7$=crosslinker moiety,
with the proviso that there is at least one $R_3$ of formula (Va).

3. The polysiloxane-polyether copolymer according to claim 2, wherein n and n$^1$ are each independently from 3 to 147 and (n+n$^1$) is ≤150, k is 0 or from 1 to 5,
R=methyl,
$R_1$=R or $R_3$,
$R_2$=R or $R_3$ or chloropropyl, vinyl or methacryloyloxypropyl, and there is at least one $R_3$ which, the same or different in each occurrence, is -Q$_1$-X—(R$_8$X—)$_w$—(CH$_2$—CH$_2$O—)$_x$—(CH$_2$—CH(R')O—)$_y$—(C(O)—O)$_p$—R" where 1=0 or 1=1 and Q=—CH$_2$—CH$_2$—CH$_2$—,
$R_8$=a linear hydrocarbon moiety —C$_j$H$_{2j}$— where j=4 to 12,
w=0 or from 1 to 100,
x=0 or from 5 to 140,
y=0 or from 5 to 140, with the proviso that the sum x+y is ≥5,
p=from 1 to 10,
R' the same of different in each occurrence=phenyl, methyl or ethyl, and R" is hydrogen, methyl, butyl or acetyl.

4. The polysiloxane-polyether copolymer according to claim 1, wherein a first set of said polyether moieties of said polysiloxane-polyether copolymer is capped with said —O—C(O)—O—R" unit and a second set of said polyether moieties of said polysiloxane-polyether copolymer contains no —O—C(O)—O—R" capping unit, or no silicon atoms.

5. The polysiloxane-polyether copolymer according to claim 1, further comprising another polysiloxane-polyether copolymer containing no polyether moieties having at least one —O—C(O)—O—R" unit as capping and one or more polyethers containing no silicon atoms admixed with said polysiloxane-polyether copolymer containing said at least one polyether moiety capped with said at least one —O—C(O)—O—R" unit.

6. A process for preparing polysiloxane-polyether copolymers, comprising reacting a polyorganosiloxane having at least one SiH or SiZ function, where Z=halogen, with at least one organic compound having at least one carbonate function and at least one further group capable of reacting with an SiH or SiZ function, and/or initially with an organic compound having an OH function and at least one group capable of reacting with an SiH or SiZ function and then with a dialkyl carbonate to provide a polysiloxane-polyether copolymer comprising at least one polyether moiety capped with at least one —O—C(O)—O—R" unit where R"=identical or different alkyl moieties, wherein said polysiloxane-polyether copolymer containing said at least one polyether moiety capped with said at least one —O—C(O)—O—R" unit has a molar fraction of from 5 to 98 mol % for polyether moieties having a capping —O—C(O)—O—R" unit, relative to the total number of polyether moieties present.

7. The process according to claim 6, wherein the organic compounds having at least one carbonate function or one further group capable of reacting with an SiH or SiZ function have an ethenyl or ethynyl end group as group capable of reacting with an SiH function.

8. The process according to claim 6, wherein the organic compounds having at least one carbonate function and at least one further group capable of reacting with an SiH or SiZ function comprise polyethers of formula (IIIa),

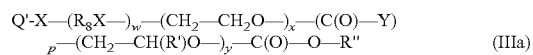

(IIIa)

where Q'=H or CH$_2$=CH—(CH$_2$)$_q$— or CH≡C—(CH$_2$)$_q$— and q=0 or 1, p=1 to 100
R" is the same or different in each occurrence and is an alkyl group, w=0 to 200, x=0 to 200, y=0 to 200, X=in each occurrence independently NR$^Z$, O or S, R$_8$ is the same or different in each occurrence, is a branched or unbranched, cyclic, saturated, unsaturated hydrocarbon moiety having an at least 2 carbon atom chain between the heteroatoms X connected via the hydrocarbon moiety,
Y=in each occurrence independently NR$^Z$, O, S, R$^Z$=the same or different in each occurrence, H or alkyl,
R'=identical or different, unsubstituted or optionally substituted alkyl or aryl groups having altogether 1 to 12 carbon atoms, and R" is the same or different in each occurrence an alkyl group.

9. The process according to claim 8, wherein a polyether of formula (IIIa) wherein Q'=CH$_2$=CH—CH$_2$—, and X and Y are each O, R$_8$=a linear hydrocarbon moiety where j=4 to 12, w=0 or from 1 to 100, x=0 or from 5 to 140, y=0 or from 5 to 140, with the proviso that the sum x+y is ≥5, p=1 to 10, R'=methyl or ethyl, and R" is methyl or butyl,
or
wherein Q'=H, X and Y are each O, R$_8$=a linear hydrocarbon moiety —C$_j$H$_{2j}$— where j=4 to 12, w=0 or from 1 to 100, x=0 or from 5 to 140, y=0 or from 5 to 140, with the proviso that the sum x+y is ≥5, p=1 to 10, R'=methyl or ethyl, and R" is hydrogen or methyl or butyl is employed.

10. The process according to claim 6, wherein the organic compounds having an OH function and at least one further group capable of reacting with an SiH or SiZ function comprise polyethers of formula (IIIb),

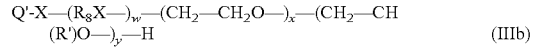

(IIIb)

where Q'=H or CH$_2$=CH—(CH$_2$)$_q$— or CH≡C—(CH$_2$)$_q$— and q=0 or 1, w=0 to 200, x=0 to 200, y=0 to 200, X=in each occurrence independently NR$^Z$, O or S, R$_8$ is the same or different in each occurrence, is a branched or unbranched, cyclic, saturated, unsaturated hydrocarbon moiety having an at least 2 carbon atom chain between the heteroatoms X connected via the hydrocarbon moiety, R'=identical or different, unsubstituted or optionally substituted alkyl or aryl groups having altogether 1 to 12 carbon atoms, and R" is the same or different in each occurrence an alkyl group.

11. The process according to claim 6, wherein said polyorganosiloxane having at least one SiH or SiZ function comprises polyorganosiloxanes having terminal and/or lateral SiH or SiZ functions, of formula (II),

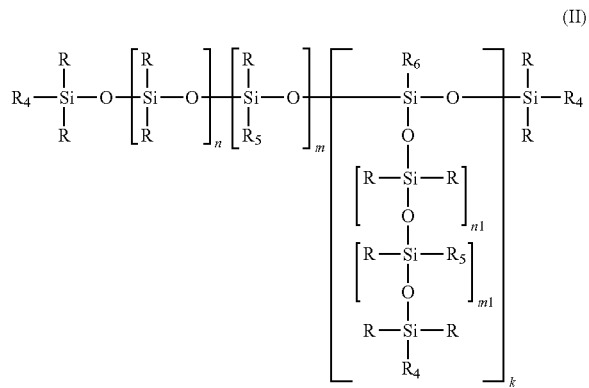

(II)

where n and $n^1$ are each independently from 0 to 500, and $(n+n^1)$ is ≤500, m and $m^1$ are each independently from 0 to 60, $(m+m^1)$ is ≤60, k=0 to 50, R=identical or different moieties comprising linear, cyclic or branched, aliphatic or aromatic, saturated or unsaturated hydrocarbon moieties having 1 up to 20 carbon atoms,

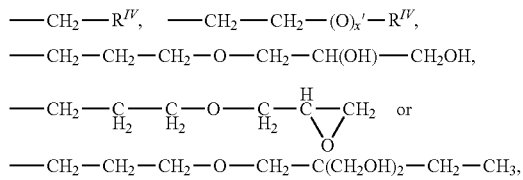

where x' is equal to 0 or 1, and $R^{IV}$ is an optionally substituted, optionally halogen-substituted hydrocarbon moiety having 1 to 50 carbon atoms, $R_4$ independently in each occurrence is hydrogen, Z or R,
$R_5$ independently in each occurrence is hydrogen, Z or R,
$R_6$ independently in each occurrence is hydrogen, Z, R or a heteroatom-substituted, functional, organic, saturated or unsaturated moiety, with the proviso that at least one of $R_4$, $R_5$ and $R_6$ is hydrogen or Z.

12. The process according to claim 11, wherein said polyorganosiloxane having at least one SiH function or SiZ function comprises polyorganosiloxanes having terminal and/or lateral SiH or SiZ functions, of formula (II) wherein n and $n^1$ are each independently from 15 to 100 and $(n+n^1)$ is ≤100, k is 0 or from 1 to 5, R=methyl, and $R_6$=R or chloropropyl, vinyl or methacryloyloxypropyl.

13. A method of preparing a polyurethane foam, said method comprising providing a mixture of an isocyanate compound, at least one compound that reacts with isocyanate groups of said isocyanate compound, water, a catalyst and a polysiloxane-polyether copolymer comprising at least one polyether moiety capped with at least one —O—C(O)—O—R" unit where R"=identical or different alkyl moieties, wherein said polysiloxane-polyether copolymer containing said at least one polyether moiety capped with said at least one —O—C(O)—O—R" unit has a molar fraction of from 5 to 98 mol % for polyether moieties having a capping —O—C(O)—O—R" unit, relative to the total number of polyether moieties present, and reacting said mixture to provide said polyurethane foam.

14. The method according to claim 13, wherein $CO_2$ is used as a blowing agent and is present in said mixture.

15. The method according to claim 13, wherein said at least one compound that reacts with isocyanate groups of said isocyanate compound is a polyether carbonate polyol.

16. A composition of matter comprising a polyurethane foam comprising a polysiloxane-polyether copolymer comprising at least one polyether moiety capped with at least one —O—C(O)—O—R" unit where R"=identical or different alkyl moieties, wherein said polysiloxane-polyether copolymer containing said at least one polyether moiety capped with said at least one —O—C(O)—O—R" unit has a molar fraction of from 5 to 98 mol % for polyether moieties having a capping —O—C(O)—O—R" unit, relative to the total number of polyether moieties present.

* * * * *